(No Model.)
E. A. SPAULDING.
DUPLEX HAND SEED PLANTER.
No. 273,628. Patented Mar. 6, 1883.
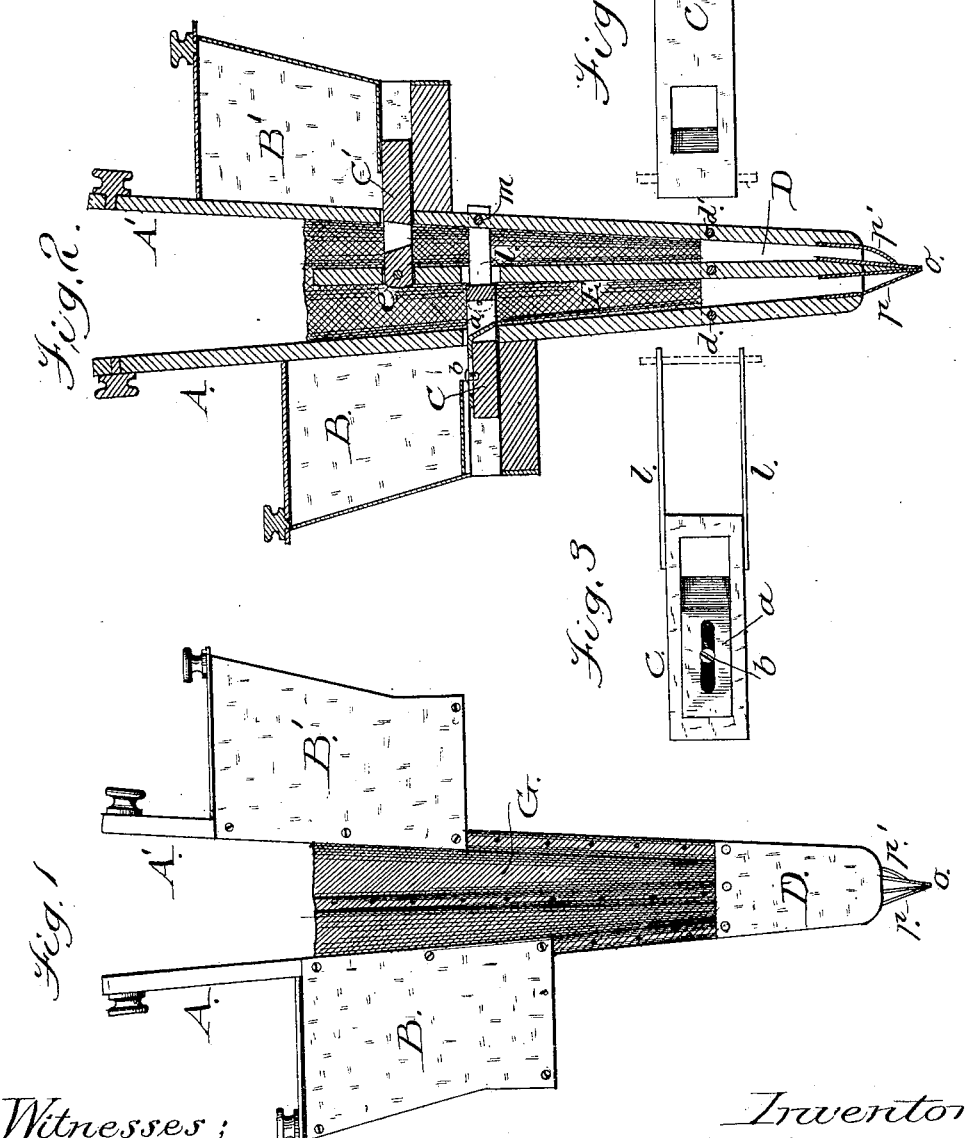
Witnesses;
B. Walter Fowler.
H. B. Applewhite.
Inventor;
Eli A. Spaulding
per attys
N. H. Evans & Co

UNITED STATES PATENT OFFICE.

ELI A. SPAULDING, OF ATHENS, OHIO.

DUPLEX HAND SEED-PLANTER.

SPECIFICATION forming part of Letters Patent No. 273,628, dated March 6, 1883.

Application filed May 16, 1882. (No model.)

*To all whom it may concern:*

Be it known that I, ELI A. SPAULDING, of Athens, in the county of Athens and State of Ohio, have invented a Duplex Hand Seed-Planter; and I do hereby declare the following to be a full, clear, and exact description thereof, reference being had to the accompanying drawings, making part of this specification, in which—

Figure 1 is a side elevation of the said planter. Fig. 2 is a vertical section of the same. Figs. 3 and 4 are details to be referred to.

The object of my invention is to provide a hand seed-planting implement adapted to simultaneously plant two kinds of seeds or cereals or one kind of grain and a fertilizer.

My invention relates to hand-planters having vibrating jaws and sliding feed-plates; and my invention consists in certain details of construction, whereby the slides are so arranged that a large seed or number of seeds or a large amount of fertilizer can be dropped with certainty, as will be hereinafter fully described and specifically claimed.

In order that those skilled in the art may make and use my invention, I will proceed to describe the manner in which I have carried it out.

In the said drawings, A is a vibrating jaw, carrying a hopper, B, in the bottom of which reciprocates a feeding-slide, C, the pocket of which is made adjustable as to size by means of the slotted plate $a$ and set-screw $b$. This jaw A is pivoted at $d$ between two plates, D D, at the lower end of the machine, and fixed in a central line between said plates D D is a diaphragm or partition, E. Another vibrating plate or handle, A', carrying a hopper, B', whose bottom is above the plane of the bottom of hopper B, is pivoted between plates D D at $d'$. The bottom of hopper B' is provided with an adjustable pocketed feed-slide, after the manner of the feed-slide in hopper B. The inner end of the feed-slide in the bottom of hopper B' is secured to the central diaphragm at $e$, and the inner end of the feed-slide in hopper B is secured by means of links $l\ l$ to the vibrating plate A' at $m$. The lower end of the central diaphragm is shod with two converging plates of sheet metal, which come together at $o$, and plates $p$ and $p'$ have their lower edges bearing against the central converging plates on the end of E when the upper ends of A and A' are remote from each other. It will be observed that plate $p$ extends below $p'$, so that when fertilizer is used from hopper B it passes through the conduit formed by the flexible connecting-sides G G and vibrating plates A A', and, being released at a lower point than the seed from hopper B', it falls beneath the seed.

The many and valuable uses and changes of planting for which this implement is adapted will be evident to all engaged in agricultural pursuits.

Having thus described my invention, what I claim as new, and desire to secure by Letters Patent, is—

In a hand seed-planter having movable sides A A' and a central stationary diaphragm, E, a hopper, B, secured to side A, in combination with a grain-slide, C, and connecting-link $l$, pivoted to the opposite movable wing, A', and passing through the stationary diaphragm E, all operating as and for the purpose set forth, substantially as herein described.

ELI A. SPAULDING.

Witnesses:
SARAH J. GROSVENOR,
JOHN LUCAS.